United States Patent Office 2,981,735
Patented Apr. 25, 1961

2,981,735
NEW PIPERAZINE DERIVATIVES

Henri Morren, Forest-Brussels, Belgium, assignor to Union Chimique Belge, S.A., Brussels, Belgium, a corporation of Belgium No Drawing. Filed Jan. 14, 1959, Ser. No. 786,685

Claims priority, application Belgium Jan. 21, 1958

6 Claims. (Cl. 260—268)

The present invention relates to new piperazine derivatives of the general formula

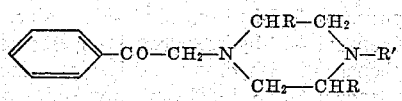

wherein R is selected from the group consisting of a hydrogen atom and a methyl radical, R' is selected from the group consisting of alkyl, hydroxyalkyl and alkoxyalkyl radicals containing from 1 to 5 carbon atoms.

The invention relates also to the preparation of these compounds and their salts of mineral or organic acids.

These new piperazine derivatives are very active antitussic agents whose activity was absolutely unexpected. The activity of these compounds exceed the effect produced by codeine (activity=1) as shown below:

| R'(R=H) | Intravenous activity | Activity per os |
|---|---|---|
| —CH$_3$ | 1.5 | 1 |
| —CH(CH$_3$)$_2$ | 1.5 | |
| —CH$_2$CH$_2$CH$_3$ | 2.0 | |
| —CH$_2$CH$_2$OH | 1.5 | |
| —CH$_2$CH$_2$—O—CH$_2$CH$_2$OH | 3.0 | |
| —CH$_2$—CHOH—CH$_2$OH | 4.0 | 1.6 |
| —CH$_2$—C(CH$_2$OH)$_3$ | 3.0 | 1.6 |
| —CH$_2$CH$_2$CH$_2$OH | | 1.0 |
| —CH$_2$CHOH—CH$_3$ | | 1.0 |

These derivatives are very interesting pharmacologic products because of their very low toxicity.

According to the present invention, these compounds are prepared by reacting an alpha-chloroacetophenone with a piperazine derivative according to the reaction

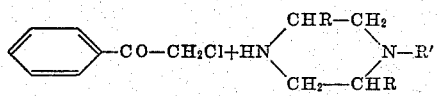

These compounds may also be obtained by heating a 1-phenacylpiperazine with a R'-halide according to the reaction

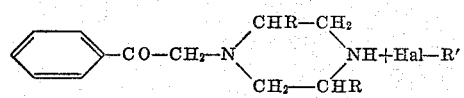

wherein R and R' have the same meaning as above and wherein Hal represents a halogen atom.

Example 1.—1-phenacyl-4-methylpiperazine dihydrochloride

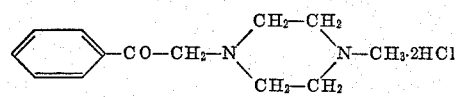

A solution of 0.1 mole of 1-methylpiperazine and 0.1 mole phenacyl chloride in 200 ml. of acetone is heated under reflux for 3 hours. The reaction mixture is then cooled.

The filtered crystals are dissolved in 60 ml. boiling ethanol. One filters on active charcoal and adds a slight excess of an alcoholic solution of hydrochloric acid. The dihydrochloride crystallizes. About 13 g. of 1-phenacyl-4-methylpiperazine dihydrochloride melting at 228° C. are obtained.

Example 2.—1-phenacyl-4-isopropylpiperazine monohydrochloride

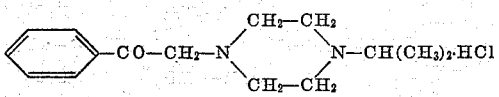

A solution of 0.07 mole of 1-isopropylpiperazine and 0.07 mole of phenacyl chloride in 150 ml. of acetone is heated under reflux for 2 hours.

After cooling, the crystals are filtered and crystallized again in boiling ethanol. 9.5 g. of 1-phenacyl-4-isopropylpiperazine monohydrochloride, melting at 178° C., are obtained.

Example 3.—1-phenacyl-4-propylpiperazine monohydrochloride

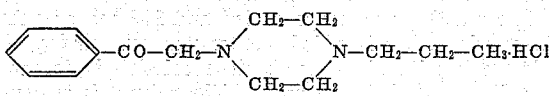

This product, obtained by the method of Example 1, from 1-propylpiperazine melts at 125° C. It is crystallized again in an ethanol-ether mixture.

Example 4.—1-phenacyl-4-(2-hydroxyethyl)-piperazine dihydrochloride

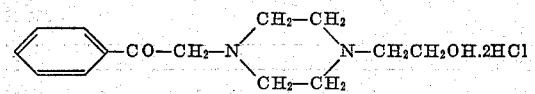

This compound is prepared according to the method described in Example 1 from 1-(2-hydroxyethyl)-piperazine and phenacyl chloride. Melting point: 240° C.

Example 5.—1-phenacyl-4-[2-(2-hydroxyethoxy)-ethyl]-piperazine dihydrochloride

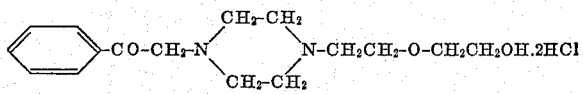

A mixture of 0.5 mole of 1-[2-(2-hydroxyethoxy)-ethyl]-piperazine, 0.6 mole of triethylamine and 0.5 mole of phenacyl chloride in 500 ml. of toluene is heated under reflux for 4 hours.

After cooling, the triethylamine hydrochloride is filtered. The organic solution is boiled off under vacuum. The residue, dissolved in boiling ethanol, is filtered on active charcoal. One adds to this solution a slight excess of an alcoholic solution of hydrochloric acid. After crystallization, 154 g. of 1-phenacyl-4-[2-(2-hydroxyethoxy)-ethyl]-piperazine dihydrochloride, melting at 205° C., are obtained.

Example 6.—1-phenacyl-4-(2,3-dihydroxypropyl)-piperazine monohydrochloride

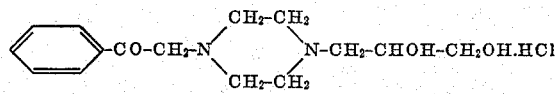

A solution of 2 moles of phenacyl chloride in 500 ml. of 1-butanol is added slowly and with stirring to a hot solution of 2 moles of 1-(2,3-dihydroxypropyl)-piperazine in 1 liter of 1-butanol.

The reaction mixture is heated under reflux for 5 hours.

After cooling, the crystals formed are filtered and crystallized again in 3.5 liters of boiling methanol.

The 1-phenacyl-4-(2,3-dihydroxypropyl)-piperazine monohydrochloride, obtained in a yield of 76%, melts at 172° C.

The following products are obtained according to the process of this example:

1-phenacyl-4-(2-hydroxypropyl)-piperazine
   Melting point: 255° C. (with decomposition)
1-phenacyl-4-(3-hydroxypropyl)-piperazine
   Melting point: 210–211° C.

*Example 7.—1-phenacyl-4-(2,2-dimethylol-3-hydroxypropyl)-piperazine*

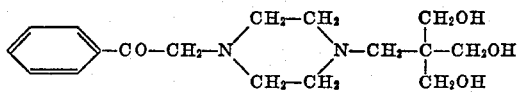

An aqueous solution of sodium hydroxide is added to 0.11 mole of 1-phenacyl-piperazine dimaleate. The liberated base is extracted three times with 100 ml. of benzene. The benzenic extracting solutions are dried with potassium carbonate.

The organic solvent is boiled off and the residue is dissolved in 100 ml. of 1-butanol. To this solution is added a solution of 0.1 mole of pentaerythritol bromhydrin in 50 ml. of 1-butanol. The reaction mixture is heated under reflux for 10 hours.

The reaction product is cooled and 300 ml. of anhydrous ethyl ether is added. After vigorous stirring, the mixture is allowed to stand. The solution is decanted and filtered on bone charcoal. The solvent is removed under vacuum and the residue is dissolved in boiling ethanol. After cooling, 1-phenacyl-4-(2,2-dimethylol-3-hydroxypropyl)-piperazine of the formula $C_{17}H_{26}N_2O_4$ is obtained with a melting point of 129° C. Yield: 25%.

The chemical analysis gives the following results:

|  | Percent N |
|---|---|
| Calculated | 8.69 |
| Found | 8.62 |

The 1-phenacyl-piperazine dimaleate used as starting product is obtained as follows:

To a hot solution of 3 moles of piperazine in 1 liter of toluene is added with stirring a solution of 1 mole of phenacyl chloride in 250 ml. of toluene. This mixture is heated under reflux for 10 hours and thereafter allowed to stand for 15 hours. The formed solid is filtered and the toluenic solution is washed twice with water. The toluenic solution is dried and the solvent is thereafter removed under vacuum. The residue is dissolved in 500 ml. of ethanol.

The hot solution is poured in a hot solution of 2 moles of maleic acid in 900 ml. of ethanol.

After crystallization, 305 g. of 1-phenacyl-piperazine dimaleate of the formula $C_{12}H_{16}N_2O.2C_4O_4H_4$, melting at 160° C. (with decomposition), are obtained.

The chemical analysis gives the following results:

|  | Percent N |
|---|---|
| Calculated | 6.42 |
| Found | 6.36 |

I claim:
1. 1-phenacyl-4-(2-hydroxyethyl)-piperazine.
2. 1-phenacyl-4-(2-hydroxypropyl)-piperazine.
3. 1-phenacyl-4-(3-hydroxypropyl)-piperazine.
4. 1-phenacyl-4-(2,3-dihydroxypropyl)-piperazine.
5. 1-phenacyl-4-(2,2-dimethylol-3-hydroxypropyl)-piperazine.
6. 1-phenacyl-4-[2-(2-hydroxyethoxy)-ethyl]-piperazine.

References Cited in the file of this patent
UNITED STATES PATENTS

| 2,881,172 | Weston et al. | Apr. 7, 1959 |

FOREIGN PATENTS

| 789,704 | Great Britain | Jan. 29, 1958 |

OTHER REFERENCES

Harfenist: Jour. Amer. Chem. Soc., vol. 76, pages 4991–4993 (1954).